(12) United States Patent
Sugamoto et al.

(10) Patent No.: US 9,732,237 B2
(45) Date of Patent: Aug. 15, 2017

(54) COATING COMPOSITION, AND METHOD FOR FORMING COATING FILM

(71) Applicant: KANSAI PAINT CO., LTD., Hyogo (JP)

(72) Inventors: Keiji Sugamoto, Kanagawa (JP); Kou Yoshida, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 14/902,030

(22) PCT Filed: Jul. 4, 2014

(86) PCT No.: PCT/JP2014/067925
§ 371 (c)(1),
(2) Date: Dec. 30, 2015

(87) PCT Pub. No.: WO2015/002299
PCT Pub. Date: Jan. 8, 2015

(65) Prior Publication Data
US 2016/0200922 A1 Jul. 14, 2016

(30) Foreign Application Priority Data

Jul. 4, 2013 (JP) ................................. 2013-140309

(51) Int. Cl.
| C09D 201/00 | (2006.01) |
| C09D 7/12 | (2006.01) |
| B05D 5/06 | (2006.01) |
| B05D 7/24 | (2006.01) |
| B05D 7/00 | (2006.01) |
| C09D 133/12 | (2006.01) |

(52) U.S. Cl.
CPC .............. *C09D 7/1216* (2013.01); *B05D 5/06* (2013.01); *B05D 7/24* (2013.01); *B05D 7/53* (2013.01); *B05D 7/54* (2013.01); *B05D 7/57* (2013.01); *C09D 7/12* (2013.01); *C09D 7/1266* (2013.01); *C09D 133/12* (2013.01); *C09D 201/00* (2013.01); *B05D 2202/00* (2013.01)

(58) Field of Classification Search
CPC ........ B05D 7/57; B05D 2202/00; C09D 7/00; C09D 7/1216; C09D 7/1266
USPC ......... 427/407.1; 106/287.19, 436, 456, 459, 106/472
See application file for complete search history.

(56) References Cited

U.S. PATENT DOCUMENTS

| 2006/0121205 A1 | 6/2006 | Menovcik |
| 2006/0177639 A1 | 8/2006 | Elzen et al. |
| 2008/0058495 A1* | 3/2008 | Quillen ................ C08K 5/0041 528/272 |

FOREIGN PATENT DOCUMENTS

| CN | 101068861 | 11/2007 |
| CN | 101151103 | 3/2008 |
| JP | 9-1049 | 1/1997 |
| JP | 2002-256216 | 9/2002 |
| JP | 2009-509752 | 3/2009 |
| JP | 2009-297631 | 12/2009 |
| JP | 2009-297631 A * | 12/2009 |
| JP | 2011-68703 | 4/2011 |
| WO | 2007/041228 | 4/2007 |
| WO | 2011/125490 | 10/2011 |

OTHER PUBLICATIONS

Titanium Dioxide Pigment, Copyright 2008 Sunjin Chem & Tech Co., Ltd., 2 pages.*
Carbon Black Products, Copyright 2006 Mitsubishi Chemical Corporation, 2 pages.*
International Search Report issued Sep. 22, 2014 in International Application No. PCT/JP2014/067925.
The First Office Action issued Nov. 21, 2016 in corresponding Chinese Application No. 201480046355.2, with English translation.

* cited by examiner

*Primary Examiner* — William Phillip Fletcher, III
(74) *Attorney, Agent, or Firm* — Wenderoth, Lind & Ponack, L.L.P.

(57) ABSTRACT

The present invention provides a coating composition capable of forming a coating film that is applicable to a variety of industrial products, particularly automobile exterior panels, while exhibiting a high lightness and a low ultraviolet transmittance at a wavelength of 420 to 480 nm. The present invention relates to a coating composition comprising a chloride process titanium oxide pigment, a yellow iron oxide pigment, a carbon black pigment having a primary average particle size of 15 to 80 nm, and a resin composition, which is a vehicle-forming component.

3 Claims, No Drawings

COATING COMPOSITION, AND METHOD FOR FORMING COATING FILM

CROSS-REFERENCE TO RELATED APPLICATIONS

This application claims priority to Japanese Patent Application No. 2013-140309, filed on Jul. 4, 2013, the disclosure of which is hereby incorporated by reference in its entirety.

TECHNICAL FIELD

The present invention relates to a coating composition capable of forming a coating film having a high lightness and a low ultraviolet transmittance at a wavelength 420 to 480 nm, and a method for forming a coating film comprising stacking a color base coating film on a coating film obtained by applying the coating composition to a substrate.

BACKGROUND ART

Industrial products, such as automobiles, are often provided with a coating for the purpose of protection and aesthetic appearance. When the substrate to be coated is a plastic material, ultraviolet rays must be prevented from reaching the surface of the material to protect the material from degradation when outdoors. When the substrate is a metallic material, the material may be treated to have an aesthetic appearance after a coating film of an anticorrosion coating composition is formed from the standpoint of corrosion resistance. In the latter case as well, ultraviolet rays must be prevented from reaching the surface of the coating film formed of an anticorrosion coating composition.

Patent Literature 1 teaches that UV transmission is controlled in a method for producing a multilayer coating comprising the successive steps of applying an 8- to 20-μm thick coating layer from an aqueous coating composition A to a substrate provided with an EDC primer, applying a 5- to 15-μm thick base coat layer from an aqueous coating composition B to the previously applied coating layer, applying a clear coat layer to the base coat layer, and jointly curing the three coating layers. Patent Literature 1 discloses as a technique only that the coating compositions A and B are different from each other, and that the coating composition A contains at least one metal platelet pigment having a thickness from 10 to 100 nm in a proportion corresponding to a pigment/resin solids ratio by weight from 0.06:1 to 0.2:1. Thus, Patent Literature 1 cannot be applied to the full gamut of colors.

CITATION LIST

Patent Literature

PTL 1: JP2009-509752A

SUMMARY OF INVENTION

Technical Problem

An object of the present invention is to provide a coating composition capable of forming a coating film having a high lightness and a low ultraviolet transmittance at a wavelength of 420 to 480 nm, and a method for forming a coating film comprising stacking a color base coating film on the coating film obtained by applying the coating composition to a substrate.

Solution to Problem

The present invention relates to the following subject matter.

Item 1. A coating composition comprising
  a chloride process titanium oxide pigment,
  a yellow iron oxide pigment,
  a carbon black pigment having a primary average particle size of 15 to 80 nm, and
  a resin composition, which is a vehicle-forming component,
wherein when the coating composition is applied to give a cured film having a thickness of 25 μm, the resulting cured coating film has an average light transmittance within the range of 0.1 to 1.0% at a wavelength of 420 nm to 480 nm.

Item 2. The coating composition according to Item 1, wherein when the coating composition is applied to give a cured film having a thickness of 25 μm, the resulting cured coating film has an L*value within the range of 80 to 95, an a*value within the range of −2.0 to 2.0, and a b*value within the range of 0.1 to 5.0 in the L*a*b* color space.

Item 3. A method for forming a coating film, the method comprising forming a color base coating film on a coating film obtained by applying the coating composition according to Item 1 or 2 to a substrate.

Item 4. The method for forming a coating film according to Item 3, wherein the color base coating film comprises a coating film obtained by applying a metallic coating composition containing a flake-effect pigment; and a coating film obtained by applying top clear coating composition.

Advantageous Effects of Invention

The present invention can provide a coating composition capable of forming a coating film having a high lightness and a low ultraviolet transmittance at a wavelength of 420 to 480 nm, and a method for forming a coating film comprising stacking a color base coating film on the coating film obtained by applying the coating composition to a substrate.

DESCRIPTION OF EMBODIMENTS

The coating composition according to the present invention comprises a chloride process titanium oxide pigment with the aim of masking the substrate.

The chloride process titanium oxide pigment is an industrially produced titanium oxide pigment, and is produced by the following steps. The chloride process titanium oxide pigment is made from a starting material, such as natural titanium and synthesized titanium. Coke is added to the starting material, and the mixture is reacted with chlorine gas at a high temperature to generate crude $TiCl_4$. Solid impurities are removed from the generated crude $TiCl_4$, and the resulting reaction product is rectified at a temperature of 136° C. or more. The purified, high purity $TiCl_4$ is heated to about 1,000° C., and reacted with oxygen to generate titanium oxide particles. The obtained titanium oxide particles are pulverized, sized, surface-treated, washed, dried, and pulverized for finishing, thus producing a titanium oxide pigment usable as a starting material for coating compositions. The chloride process titanium oxide pigment of the present invention may be those surface-treated with oxides or hydroxides of silica, alumina, zirconia, or the like, or those surface-treated with an organosilicon compound, typically polydimethylsiloxane, a higher fatty acid, typically stearic acid, or an organotitanium compound, typically isopropyl triisostearoyl titanate, for the purpose of enhancing weatherability.

The chloride process titanium oxide pigment for use in the present invention preferably has an average particle size of 200 to 700 nm, and more preferably 300 to 500 nm, from the standpoint of the tinting power and finished appearance of the coating film obtained by coating. The average particle size of a titanium oxide pigment as used herein refers to the average particle size as measured by observation with an electronic microscope. Because titanium oxide pigments are substantially in a spherical shape, the diameter thereof is measured. Specifically, 100 particles are selected from a transmission electron microscopic image, and the average particle size thereof is determined using free software NIH Image 1.63 produced by the National Institute of Health (NIH, United States).

From the standpoint of the masking and the finished appearance of the substrate, the chloride process titanium oxide pigment is present in the coating composition of the present invention in an amount of preferably 50 parts by mass to 150 parts by mass, and more preferably 80 parts by mass to 120 parts by mass on a solids basis, per 100 parts by mass of a resin composition on a solids basis, which is a vehicle-forming component described later.

The coating composition according to the present invention further contains a yellow iron oxide pigment. The yellow iron oxide pigment is a yellow pigment containing iron oxyhydroxide represented by α-FeO(OH) or α-$Fe_2O_2.H_2O$, and natural yellow iron oxide and synthetic yellow iron oxide are both available in the market.

Natural yellow iron oxide has been used as a coloring material since before recorded history, and classified into ocher, amber, sienna, and the like. Natural yellow iron oxide is naturally produced in many parts of the world, such as India, France, Italy, South Africa, America and China.

Synthetic yellow iron oxide is obtained by adding an alkali to a ferrous sulfate aqueous solution to generate a precipitate of ferrous hydroxide and oxidizing the precipitate with air to generate crystal nuclei of α-$Fe_2O_2.H_2O$. Further, adding iron scrap to a ferrous sulfate aqueous solution and blowing air thereinto with heating to hydrolyze the mixture grows the crystal nuclei of α-$Fe_2O_2.H_2O$ to thereby produce yellow iron oxide with a bright yellow color.

Yellow iron oxide itself belongs to the crystal system (orthorhombic crystal) of goethite, and has a needle-like morphology. From the standpoint of the color tone of the coating film obtained by coating, a pigment of yellow iron oxide having a needle-like morphology with the length/width ratio being about 6/1 to 10/1 is used for the coating composition of the present invention. The length of yellow iron oxide for use is 0.6 to 1.2 μm. These values defining the morphology of a yellow iron oxide pigment are values as measured by observation with an electronic microscope.

From the standpoint of the control of color tone and ultraviolet transmission of the coating film obtained by coating, the yellow iron oxide pigment is present in the coating composition of the present invention in an amount of preferably 0.01 parts by mass to 1 part by mass, and more preferably 0.05 parts by mass to 0.5 parts by mass on a solids basis per 100 parts by mass of a resin composition on a solids basis, which is a vehicle forming component described later.

The coating composition of the present invention contains a carbon black pigment having a primary average particle size of 15 nm or more to 80 nm or less with the aim of controlling the lightness and the hue of the coating film.

The primary average particle size of the carbon black pigment and the average particle size of the structures as used herein refer to the average particle size as measured by observation with an electronic microscope. Because carbon black forms structures, the primary particle size of carbon black indicates the value obtained by measuring the diameter of a spherical portion in a structure. Specifically, the primary average particle size of carbon black is determined by selecting 100 spherical portions in structures from a transmission electron microscopic image and calculating the average particle size by using free software NIH Image 1.63 produced by the National Institute of Health (NIH, United States).

The carbon black pigment is present in the coating composition of the present invention in an amount of 0.01 to 10 parts by mass, and more preferably 0.01 to 8 parts by mass on a solids basis per 100 parts by mass of resin solids in the coating composition, from the standpoint of the lightness of the coating film.

The coating composition of the present invention may further contain an aluminum flake pigment from the standpoint of masking the substrate.

Aluminum flake pigments are typically produced by grinding or milling aluminum in a ball mill or an attritor mill in the presence of a grinding liquid medium using a grinding lubricant. Examples of grinding lubricants to be used include higher fatty acids, such as oleic acid, stearic acid, isostearic acid, lauric acid, palmitic acid, and myristic acid, as well as aliphatic amines, aliphatic amides, and aliphatic alcohols. Examples of grinding liquid media to be used include aliphatic-based hydrocarbons, such as mineral spirits.

Aluminum flake pigments fall into the general classifications of leafing aluminum flake pigments and non-leafing aluminum flake pigments, according to the type of grinding lubricant. When a leafing aluminum flake pigment is incorporated in a coating composition, the aluminum particles align (leafing) on the surface of a coating film obtained by applying this coating composition, providing a finished appearance with a strong metallic texture. Because this coating film has a heat reflection effect and rust resistance, this coating film is usually used in a variety of building materials, such as tanks, ducts, pipes, and roofing materials. From the standpoint of a masking effect on the coating film obtained by coating, it is preferable to use a non-leafing aluminum flake pigment for the coating composition of the present invention.

The aluminum flake pigment to be used preferably has an average particle size of 5 to 30 μm, more preferably 7 to 25 μm, and particularly more preferably 8 to 23 μm, from the standpoint of the finished appearance and the lightness of the formed coating film after masking. The aluminum flake pigment to be used preferably has a thickness of 0.05 to 0.5 μm. The particle size and thickness as used herein refer to the values as measured by observation of the aluminum flake pigment with an optical microscope or an electronic microscope or the values as measured with a particle size distribution analyzer using a laser as in laser diffractometry.

The aluminum flake pigment, when used, is preferably present in an amount of 0.1 to 25 parts by mass in total, more preferably 0.3 to 20 parts by mass in total, and particularly more preferably 0.5 to 20 parts by mass in total, per 100 parts by mass of resin solids in the coating composition from the standpoint of the finished appearance of the coating film obtained by coating.

The formulation of the above-described coloring materials to be contained in the coating composition of the present invention is adjusted such that the resulting coating film formed by applying the coating composition so as to have a thickness of 25 µm as a cured coating film has an average light transmittance of 0.1 to 1.0% at a wavelength of 420 to 480 nm.

The light transmittance as used herein is defined as a value determined as follows: a coating composition is applied to a smooth PTFE plate such that the thus formed coating film, when cured, has a thickness of 25 µm, and the film is cured, followed by measuring the light transmittance of the peeled coating film with a UV3700 Spectrophotometer (trade name, produced by Shimadzu Corporation).

The formulation of the above-described coloring materials to be contained in the coating composition of the present invention can be adjusted such that the resulting coating film formed by applying the coating composition so as to have a thickness of 25 µm as a cured coating film has an L*value of 80 to 95, an a*value of −2.0 to 2.0, and a b*value of 0.1 to 5.0 in the L*a*b* color space. The L*a*b* color space was standardized in 1976 by Commission internationale de l'eclairage (CIE), and also adopted in JIS Z 8729 in Japan. The color space shows the lightness by L*, and the hue and chroma, which indicate the chromaticity, by a* and b*, respectively, where a* is the red direction (−a* is the green direction), while b* is the yellow direction (−b* is the blue direction).

The L*, and the a* and b* as used herein are defined as values determined from the spectral reflectance values measured using an MA-68II multi-angle spectrophotometer (product, name, Produced by Danaher Corporation), illuminating a coating film at an angle of 45°, with the receiving angle at 45° away from the specularly reflected light.

The color pigments, such as the chloride process titanium oxide pigment and the yellow iron oxide pigment, can be added to the coating composition of the present invention as a powder. Alternatively, such color pigments may be mixed with and dispersed in a portion of the resin composition to prepare a pigment dispersion beforehand, and the pigment dispersion may be mixed with the remaining resin component or other components to prepare a coating composition. In the preparation of the pigment dispersion, conventional additives used for coating compositions, such as an antifoaming agent, a dispersant, and a surface control agent, may optionally be added.

The coating composition of the present invention contains a resin composition as a vehicle-forming component. Specific examples include combinations of a base resin having a crosslinkable functional group (e.g., hydroxyl group), such as acrylic resin, polyester resin, alkyd resin, and urethane resin, with a crosslinking agent, such as melamine resin, urea resin, and a polyisocyanate compound (including a blocked polyisocyanate compound). Such resin components are dissolved or dispersed in an organic solvent and/or a solvent, such as water, before use.

Further, the coating composition of the present invention may optionally and suitably contain a solvent, such as water and an organic solvent, various additives, such as a pigment dispersant, a curing catalyst, an antifoaming agent, an antioxidizing agent, an ultraviolet absorber, and a surface control agent, a flatting agent, and an extender pigment.

The coating composition of the present invention is prepared by mixing and dispersing the above-described components. It is, preferable to adjust the solids content at the time of applying the coating composition to 12 to 60% by mass, and preferably 15 to 50% by mass, based on the coating composition.

After being adjusted to a viscosity suitable for coating by adding water, an organic solvent, or the like, the coating composition of the present invention is applied by a known method, such as rotary atomization coating, air spray, or airless spray. The coating composition can be applied such that the cured film has a thickness of 15 to 40 µm from the standpoint of the smoothness of the coating film, or the like.

The method for forming a multilayer coating film according to the present invention comprises applying the coating composition to a substrate to form a coating film and stacking a color base coating film on the thus formed coating film.

Examples of substrates include metals, such as iron, zinc, aluminum, and magnesium; alloys containing these metals; molded articles plated or vapor-deposited with these metals; and molded articles of, for example, glass, plastic, or a foamed body. Materials that are degreased or surface-treated depending on the type of, material may be used as a substrate. Further, an undercoating film may be formed on the surface of the materials or the molded articles for use as a substrate.

The undercoating film is formed to mask the surface of materials, or to impart corrosion resistance or rust resistance to materials. The undercoating film is obtained by applying, drying, and curing an undercoating composition. There is no particular limitation to the types of undercoating composition, and examples include electrodeposition coating compositions and solvent-based primers.

The following describes the case where the color base coating film has a solid color, which does not look a different color depending on the viewing angle. In this case, the color base coating film can be formed by applying a color base coating composition.

The color base coating composition typically contains a color pigment. There is no particular limitation to the color pigment, but specific examples include organic pigments, such as azo-based pigments, quinacridone-based pigments, diketopyrrolopyrrole-based pigments, perylene-based pigments, perinone-based pigments, benzimidazolone-based pigments, isoindoline-based pigments, isoindolinone-based pigments, metal chelate azo pigments, phthalocyanine-based pigments, indanthrone-based pigments, dioxazine-based pigments, threne-based pigments, and indigo-based pigments; metal oxide pigments, such as titanium oxide pigments; and carbon black pigments. These pigments can be used singly or in a combination of two or more.

In the present invention, the color pigment is preferably present in the color base coating composition in an amount of typically 0.01 to 150 parts by mass, and particularly 0.05 to 120 parts by mass on a solids basis, per 100 parts by mass of the resin solids in the coating composition from the standpoint of the lightness of the multilayer coating film, and the like.

The color pigment to be contained in the color base coating composition of the present invention may be added to the coating composition as a powder. Alternatively, the color pigment may be mixed with and dispersed in a portion of a resin composition to prepare a pigment dispersion beforehand, and the pigment dispersion may be mixed with the remaining resin component or other components to prepare a coating composition. In the preparation of the pigment dispersion, conventional additives used for coating compositions, such as an antifoaming agent, a dispersant, and a surface control agent, may optionally be added.

The color base coating composition of the present invention can typically contain a resin component as a vehicle. Specific examples of resin components include combinations of a base resin having a crosslinkable functional group (e.g., hydroxyl group), such as acrylic resin, polyester resin, alkyd resin, and urethane resin, with a crosslinking agent, such as melamine resin, urea resin, a polyisocyanate compound (including a blocked polyisocyanate compound). Such resin components are dissolved or dispersed in an organic solvent and/or a solvent, such as water, before use.

Moreover, the metallic base coating composition of the present invention may optionally and suitably contain a solvent, such as water and an organic solvent, various additives, such as a dispersant, an antisettling agent, a curing catalyst, an antifoaming agent, an antioxidizing agent, an ultraviolet absorber, a surface control agent, and a rheology control agent, and an extender pigment.

The metallic base, coating composition of the present invention is prepared by mixing and dispersing the above-described components. It is preferable to adjust the solids content at the time of applying the coating composition to 12 to 60% by mass, and preferably 15 to 50% by mass, based on the coating composition and to adjust the viscosity to 17 to 23 seconds as measured by Ford cup No. 3 at 20° C.

The color base coating composition of the present invention is applied by a method, such as electrostatic spraying, air spray, or airless spray. It is preferable to apply the color base coating composition such that the thus formed coating film, when cured, has a thickness of 5 to 30 μm from the standpoint of the smoothness of the coating film.

The following describes a case where the color base coating film has a metallic color, which looks a different color depending on the viewing angle. In this case, the color base coating film can be formed by applying a metallic coating composition to the coating film formed of the coating composition of the present invention, and further applying a top clear coating composition to the thus obtained coating film.

The metallic coating composition contains a flake-effect pigment for imparting graininess to the coating film to be obtained by coating. As the flake-effect pigment, one or more types of pigments can suitably be selected from light reflective pigments and light interference pigments.

Specific examples of light reflective pigments include metal flake pigments, such as aluminum, copper, nickel alloys, and stainless; metal flake pigments, such as those whose surface is coated with a metal oxide; metal flake pigments, such as those having a color pigment chemisorbed or bound to their surface; and aluminum flake pigments having an aluminum-oxide layer formed by an oxidation reaction on their surface. However, for the coating composition of the present invention, aluminum flake pigments can be used from the standpoint of the graininess or finished appearance obtained by coating.

Aluminum flake pigments are typically produced by grinding or milling aluminum in a ball mill or an attritor mill in the presence of a grinding liquid medium using a grinding lubricant. Examples of grinding lubricants to be used include higher fatty acids, such as oleic acid, stearic acid, isostearic acid, lauric acid, palmitic acid, and myristic acid, as well as aliphatic amines, aliphatic amides, and aliphatic alcohols. Examples of grinding liquid media to be used include aliphatic-based hydrocarbons, such as mineral spirits.

Aluminum flake pigments fall into the general classifications of leafing aluminum flake pigments and non-leafing aluminum flake pigments, according to the type of grinding lubricant. When a leafing aluminum flake pigment is incorporated in a coating composition, the aluminum particles align (leafing) on the surface of a coating film obtained by applying this coating composition, providing a finished appearance with a strong metallic texture. Because this coating film has a heat reflection effect and rust resistance, this coating film is usually used in plant equipment, such as tanks, ducts, and pipes, and a variety of building materials, such as roofing materials. It is possible to use a leafing aluminum flake pigment in the present invention; however, note that a leafing aluminum flake pigment, when used, may completely mask the surface of the coating film in the process of forming the coating film because of the surface tension effect of the grinding lubricant, thereby decreasing the graininess, although this depends on the amount of the leafing aluminum flake pigment added. Thus, it is preferable to use a non-leafing aluminum flake pigment.

The aluminum flake pigment to be used preferably has an average particle size of 8 to 25 μm, and more preferably 10 to 18 μm, from the standpoint of finished appearance, lightness of the highlight, and graininess of the formed coating film. The aluminum flake pigment to be used preferably has a thickness of 0.2 to 1.0 μm. The particle size as used herein refers to the median size of a volume-based particle size distribution measured by a laser diffraction scattering method using a Microtrack MT3300 particle size distribution analyzer (trade name, produced by Nikkiso Co., Ltd.).

An average particle size exceeding the upper limit stated above may lead to an excessive graininess of the coating film obtained by coating, making the film undesirable from an aesthetic perspective. An average particle size below the lower limit stated above may lead to insufficient graininess.

For the coating composition of the present invention, a light interference pigment can be used as a flake-effect pigment.

In the present specification, specific examples of light interference pigments to be used include pigments obtained by coating a translucent substrate, such as natural mica, artificial mica, alumina flakes, silica flakes, or glass flakes, with a metal oxide.

Mica pigments coated with a metal oxide are pigments obtained by coating the surface of a substrate, such as natural mica or artificial mica, with a metal oxide. Natural mica is a flaky substrate obtained by pulverizing mica from ore, whereas artificial mica is synthesized by heating an industrial material, such as $SiO_2$, $MgO$, $Al_2O_3$, $K_2SiF_6$, or $Na_2SiF_6$, to melt the material at a high temperature of about 1,500° C. and cooling the melt for crystallization. When compared with natural mica, artificial mica contains a smaller amount of, impurities, and has a more homogeneous size and thickness. Specifically, known examples include fluorophlogopite ($KMg_3AlSi_3O_{10}F_2$), potassium four silicon mica ($KMg_{25}AlSi_4O_{10}F_2$), sodium four silicon mica ($NaMg_{25}AlSi_{10}F_2$), Na taeniolite ($NaMg_2LiSi_4O_{10}F_2$), and LiNa taeniolite ($LiMg_2LiSi_4O_{10}F_2$) Examples of metal oxides used for coating include titanium oxide and iron oxide. The interference color is developed depending on the thickness of the metal oxide coating.

Alumina flake pigments coated with a metal oxide are pigments obtained by coating the surface of alumina flakes used as a substrate with a metal oxide. Alumina flakes refer to flaky (thin) aluminum oxides, which are clear and, colorless. Alumina flakes do not necessarily consist of only aluminum oxide, and may contain other metal oxides. Examples of metal oxides used for coating include titanium oxide and iron oxide. The interference color is developed depending on the thickness of the metal oxide coating.

Silica flake pigments coated with a metal oxide are pigments obtained by coating flaky silica, a substrate having a smooth surface and a uniform thickness, with a metal oxide having a refractive index different from that of the substrate. Examples of metal oxides used for coating include titanium oxide and iron oxide. The interference color is developed depending on the thickness of the metal oxide coating.

Glass flake pigments coated with a metal oxide are pigments obtained by coating a flaky glass substrate with a metal oxide. The smooth surface of the substrate causes intense light reflection to thereby develop graininess. Examples of metal oxides used for coating include titanium oxide and iron oxide. The interference color is developed depending on the thickness of the metal oxide coating.

The light interference pigments may be those treated to enhance the dispersibility, water resistance, chemical resistance, weatherability, or the like.

When natural mica, artificial mica, alumina flakes, or silica flakes are used as a light interference pigment, the light interference pigment preferably has an average particle size of 5 to 30 μm, and more preferably 7 to 25 μm from the standpoint of the finished appearance and graininess of the formed coating film. When glass flakes are used as a light interference pigment, the light interference pigment preferably has an average particle size of 15 to 100 μm, and more preferably 17 to 45 μm from the standpoint of the graininess of the formed coating film. The thickness of the light interference pigment for use is preferably 0.05 to 7.0 μm. The particle size as used herein refers to the median size of a volume-based particle size distribution measured by a laser diffraction scattering method using a Microtrack MT3300 particle size distribution analyzer (trade name, produced by Nikkiso Co., Ltd.).

An average particle size exceeding the upper limit stated above may lead to an excessive graininess brought by the light interference pigment onto the multilayer coating film, making the film undesirable from an aesthetic perspective. An average particle size below the lower limit stated above may lead to insufficient graininess.

The flake-effect pigment is present in the metallic coating composition preferably in an amount of 0.01 to 25 parts by mass in total, more preferably 0.01 to 15 parts by mass in total, and particularly more preferably 0.05 to 5 parts by mass in total, per 100 parts by mass of the solids content of the resin composition in the coating composition, from the standpoint of the finished appearance and graininess of the coating film obtained by coating.

The metallic coating composition may contain a color pigment for finely adjusting the hue and lightness of the coating film obtained by coating. There is no particular limitation to the color pigment. However, specific examples include complex oxide pigments, such as clear iron oxide pigments and titan yellow; inorganic pigments, such as titanium oxide pigments containing titanium oxide fine particles and carbon black pigments; and organic pigments, such as azo-based pigments, quinacridone-based pigments, diketopyrrolopyrrole-based pigments, perylene-based pigments, perinone-based pigments, benzimidazolone-based pigments, isoindoline-based pigments, isoindolinone-based pigments, metal chelate azo pigments, phthalocyanine-based pigments, indanthrone-based pigments, dioxazine-based pigments, threne-based pigments, and indigo-based pigments. These can be used singly or in a combination of two or more.

When the metallic coating composition used in the method for forming a coating film according to the present invention contains a color pigment, the color pigment to be used is preferably a clear color pigment having a primary particle size of 200 nm or less from the standpoint of the difference in color of the formed coating film, depending on the viewing angle.

The color pigment can be added to the coating composition as a powder. Alternatively, the color pigment may be mixed with and dispersed in a portion of a resin composition to prepare a pigment dispersion beforehand, and the pigment dispersion may be mixed with the remaining resin component or other components to prepare a coating composition. In the preparation of the pigment dispersion, conventional additives used for coating compositions, such as an antifoaming agent, a dispersant, and a surface control agent, may optionally be added.

When the metallic coating composition contains a color pigment, the color pigment is preferably present in an amount of typically 0.01 to 10 parts by mass, and particularly 0.01 to 5 parts by mass, per 100 parts by mass of the solids content of the resin composition in the coating composition from the standpoint of lightness, or the like, of the multilayer coating film.

The metallic coating composition used in the method for forming a coating film according to the present invention contains a resin composition as a vehicle-forming component. Specific examples include combinations of a base resin having a crosslinkable functional group (e.g., hydroxyl group), such as acrylic resin, polyester resin, alkyd resin, and urethane resin, with a crosslinking agent, such as melamine resin, urea resin, and a polyisocyanate compound (including a blocked polyisocyanate compound). Such resin components are dissolved or dispersed in an organic solvent and/or a solvent, such as water, before use.

The metallic coating composition may optionally and suitably contain a solvent, such as water and an organic solvent, various additives, such as a pigment dispersant, a curing catalyst, an antifoaming agent, an antioxidizing agent, an ultraviolet absorber, and a surface control agent, a flatting agent, and an extender pigment.

The metallic coating composition is prepared by mixing and dispersing the above-described components. It is preferable to adjust the solids content at the time of applying the coating composition to 12 to 60% by mass, and preferably 15 to 50% by mass, based on the coating composition.

After being adjusted to a viscosity suitable for coating by adding water, an organic solvent, or the like, the metallic coating composition in the method for forming a coating film according to the present invention is applied by a known method, such as rotary atomization coating, air spray, or airless spray. The metallic coating composition can be applied such that the thus formed film, when cured, has a thickness of 15 to 40 μm from the standpoint of the smoothness of the coating film, or the like.

In the method for forming a coating film according, to the present invention, the metallic coating composition is applied to a coating film formed of the aforementioned coating composition. When applied in that manner, the metallic coating composition can be applied to a coating film that has been crosslinked and cured by heating or electron beam irradiation. Alternatively, the metallic coating composition can be applied to an uncured coating film formed of the coating composition.

In the method for forming a coating film according, to the present invention, a top clear coating composition is applied to a cured or uncured coating film formed of the metallic coating composition to form a top clear coating film.

The top clear coating film may be a single-layered coating film obtained by applying, drying, and curing a top clear coating composition, or may be a two or more layered coating film obtained by repeating the steps of applying, drying, and curing a top clear coating composition multiple times. Forming the top clear coating film as a two or more layered coating film can enhance the finished appearance of the multilayer coating film as well as the distinctness of image.

When the top clear coating film is formed as a two or more layered coating film, the top clear coating film of the first layer and the top clear coating film of the second and subsequent layers may be made of the same material or different materials.

The top clear coating composition to be used in the method for forming a coating film according to the present invention is a liquid coating composition suitably, containing a base resin and a crosslinking agent as a vehicle-forming component, as well as a solvent and other additives for coating compositions, and the top clear coating composition is capable of forming a colorless or colored, and clear coating film. As the top clear coating composition, those known per se that are usually used as atop clear coating composition can be used without any limitation. Examples of base resins include resins having a crosslinkable functional group (e.g., hydroxy, carboxy, silanol, and epoxy), such as acrylic resin, polyester resin, alkyd resin, fluorine resin, urethane resin, and silicon-containing resin. Examples of crosslinking agents include those reactive with the functional groups of the above-listed base resins, such as melamine resin, urea resin, polyisocyanate compounds, blocked polyisocyanate compounds, epoxy compounds or, resin, carboxy-containing compounds or resin, acid anhydride, and alkoxysilane-containing compounds or resin. The top clear coating composition may optionally and suitably, contain a solvent, such as water and an organic solvent, and additives for coating compositions, such as a curing catalyst, an antifoaming agent, a rheology control agent, an antioxidizing agent, a surface control agent, and a flatting agent.

The top clear coating composition may suitably contain a color pigment, insofar as the transparency is not impaired. As the color pigment, those known per se that are usually used for ink or paint can be used singly or in a combination of two or more. The amount of the color pigment to be added is suitably determined insofar as the transparency of the coating film is not substantially impaired. Specifically, a color pigment, when added, can be present in an amount of typically 15 parts by mass or less, and preferably 0.01 to 5 parts by mass, per 100 parts by mass of the total solids content of the base resin and the crosslinking agent contained in the top clear coating composition.

After being adjusted to a viscosity suitable for coating by adding water, an organic solvent, or the like, the top clear coating composition is applied by a method known per se, such as rotary atomization coating, air spray, or airless spray. The top clear coating composition can be applied such that the thus formed film, when cured, preferably has a thickness of typically 5 to 40 µm, and particularly 20 to 35 µm. The coating film formed of the top clear coating composition itself can be crosslinked and cured at a temperature within the range of room temperature to about 150° C.

When the top clear coating film is formed as a two or more layered coating film, the top clear coating film of the first layer is dried and cured, and the top clear coating films of the second and subsequent layers can be formed on the cured first-layer film. Alternatively, after the top clear coating composition for the first layer is applied, the top clear coating film of the second layer may be formed on the uncured first-layer coating film.

EXAMPLES

The following Examples and Comparative Examples describe the present invention in more detail. However, the present invention is not limited to these Examples. Note that "parts" and "%" are expressed on a mass basis. The number average molecular weight of a hydroxy-containing acrylic resin is determined by gel permeation chromatography (GPC) using the calibration curve of standard polystyrene.

Examples 1 to 7 and Comparative Examples 1 to 3

Production Example 1: Production of Hydroxy-containing Acrylic Resin 1

50 parts of ethylene glycol monoethyl ether acetate was placed into a reactor equipped with a thermometer, a thermostat, a stirrer, a reflux condenser, and a dropping funnel, and mixed with stirring, followed by heating to 135° C. Subsequently, mixture 1 of a monomer and a polymerization initiator detailed below was added dropwise over a period of 3 hours to the reactor maintained at the same temperature. After completion of the dropwise addition, the mixture was aged for 1 hour. Thereafter, a mixture of 10 parts of ethylene glycol monoethyl ether acetate and 0.6 parts of 2,2'-azobis (2-methylpropionitrile) was added dropwise over a period of 1 and a half hours to the reactor maintained at the same temperature, followed by aging for 2 hours. Subsequently, the ethylene glycol monoethyl ether acetate was evaporated under reduced pressure, thereby obtaining hydroxy-containing acrylic resin 1 having a hydroxy value of 54 mg KOH/g, a number average molecular weight of 20,000, and a resin solids content of 65% by mass. The number average molecular weight as used herein refers to a value as determined by gel permeation chromatography (GPC) using the calibration curve of standard polystyrene.

Mixture 1 containing a monomer and a polymerization initiator:

A mixture containing 38 parts of methyl methacrylate, 17 parts of ethyl acrylate, 17 parts of n-butyl acrylate, 7 parts of hydroxyethyl methacrylate, 20 parts of lauryl methacrylate, 1 part of acrylic acid, and 2 parts of 2,2'-azobis(2-methylpropionitrile)

Preparation of Coating Compositions 1 to 10

Pigments in the formulations shown in Table 1 (PHR) were individually mixed by stirring with 100 parts (solids content) of a resin component containing 75 parts of the hydroxy-containing acrylic resin 1 obtained in Production Example 1 and 25 parts of U-Van 28-60 (trade name, butyl etherified melamine resin, produced by Mitsui Chemicals, Inc.). Each of the mixtures was diluted and adjusted to a viscosity suitable for coating, thereby obtaining coating compositions 1 to 10 having a solids content of about 25%.

TABLE 1

|  |  | Pigment Formulation | | Light Transmittance (%) | Colorimetric Value (45/0) | | |
|---|---|---|---|---|---|---|---|
|  |  | Type | Concentration (PHR) | Average in 420 to 480 nm | L* | a* | b* |
| Example 1 | Coating Composition 1 | a/c/d | 100/0.3/0.04 | 0.7 | 88.0 | −1.0 | 3.0 |
| Example 2 | Coating Composition 2 | a/c/d | 80/0.3/0.03 | 1.0 | 87.0 | −1.0 | 4.0 |
| Example 3 | Coating Composition 3 | a/c/d | 120/0.4/0.05 | 0.5 | 88.0 | −1.0 | 3.0 |
| Example 4 | Coating Composition 4 | a/c/d | 140/0.1/0.08 | 1.0 | 85.0 | −1.0 | 0.5 |
| Example 5 | Coating Composition 5 | a/c/d | 140/0.6/0.02 | 1.0 | 91.0 | 0.0 | 5.0 |
| Example 6 | Coating Composition 6 | a/c/e | 140/0.3/0.06 | 1.0 | 91.0 | 0.0 | 5.0 |
| Example 7 | Coating Composition 7 | a/c/d/g | 100/0.3/0.01/0.2 | 0.8 | 86.0 | −1.0 | 2.5 |
| Comp. Ex. 1 | Coating Composition 8 | a/c/f | 100/0.3/0.02 | 1.2 | 87.0 | −1.0 | 5.0 |
| Comp. Ex. 2 | Coating Composition 9 | b/c/d | 100/0.3/0.02 | 1.4 | 88.0 | −1.0 | 3.0 |
| Comp. Ex. 3 | Coating Composition 10 | b/d | 100/0.08 | 1.2 | 87.0 | −2.0 | 0.0 | a: Tipaque UT-771 (trade name, chloride process titanium oxide pigment, produced by Ishihara Sangyo Kaisha, Ltd.)
b: Titanix JR-806 (trade name, sulfate process titanium oxide pigment, produced by Tayca Corporation)
c: Tarox LL-50 (trade name, yellow iron oxide pigment, produced by Titan Kogyo, Ltd.)
d: Special Black 100 (trade name, carbon black pigment, primary average particle size 50 nm, produced by Orion Engineered Carbons)
e: MA-100 (trade name, carbon black pigment, primary average particle size 20 nm, produced by Mitsubishi Chemical Corporation)
f: Monarch 1300 (trade name, carbon black pigment, primary average particle size 10 nm, produced by Cabot Corporation)
g: CR-9800: aluminum flake pigment, average particle size 7 μm, produced by Asahi Kasei Chemicals Corporation)

Measurement of Light Transmittance

Coating compositions 1 to 10 were individually applied to a smooth PTFE plate so that the formed films; when cured, have a thickness of 25 μm, and then allowed to stand in a laboratory at a room temperature of about 20° C. for 15 minutes, followed by drying with a hot-air dryer at 140° C. for 30 minutes, thereby obtaining cured coating films. The obtained coating films were peeled to prepare free films, and the peeled films were measured for light transmittance at a wavelength of 420 to 480 nm with a UV3700 spectrophotometer (trade name, produced by Shimadzu Corporation). Table 1 shows the average light transmittance.

Measurement of L*, a*, b*

Coating compositions 1 to 10 were individually applied to a tin plate on which a gray (N-7) intermediate coating film was formed beforehand so that the formed films of coating compositions 1 to 10, when cured, have a thickness of 25 μm, and then allowed to stand in a laboratory at a room temperature of about 20° C. for 15 minutes, followed by drying with a hot-air dryer at 140° C. for 30 minutes, thereby obtaining cured coating films. The spectral reflectance values were measured using an MA-68II multi-angle spectrophotometer (product name, produced by Danaher Corporation), illuminating the coating films at an angle of 45°, with the receiving angle at 45° away from the specularly reflected light. The L*, a*, and b* values were calculated from the spectral reflectance values. Table 1 shows the results.

Coating compositions 1 to 7 were evaluated for finished appearance following the procedure described below.

Evaluation of Finished Appearance

The test plates used in the measurement of L*, a*, and b* values were observed under an artificial sunlight lamp (produced by Seric., Ltd., color temperature 6500 K), and the finished appearance was evaluated on a scale of 1 to 5. Table 1 shows the results, with 5 being the highest rating and 1 being the lowest. The evaluation was conducted by two designers and three engineers (5 evaluators in total) engaged in color development for 3 or more years, and the average values were determined. Table 2 shows the results.

TABLE 2

|  |  | Pigment Formulation | | Finished Appearance |
|---|---|---|---|---|
|  |  | Type | Concentration (PHR) |  |
| Example 1 | Coating Composition 1 | a/c/d | 100/0.3/0.04 | 5 |
| Example 2 | Coating Composition 2 | a/c/d | 80/0.3/0.03 | 5 |
| Example 3 | Coating Composition 3 | a/c/d | 120/0.4/0.05 | 4 |
| Example 4 | Coating Composition 4 | a/c/d | 140/0.1/0.08 | 3 |
| Example 5 | Coating Composition 5 | a/c/d | 140/0.6/0.02 | 3 |
| Example 6 | Coating Composition 6 | a/c/e | 140/0.3/0.06 | 4 |
| Example 7 | Coating Composition 7 | a/c/d/g | 100/0.3/0.01/0.2 | 4 |

Pigment
a: Tipaque UT-771 (trade name, chloride process titanium oxide pigment, produced by Ishihara Sangyo Kaisha, Ltd.)
b: Titanix JR-806 (trade name, sulfate process titanium oxide pigment, produced by Tayca Corporation)
c: Tarox LL-50 (trade name, yellow iron oxide pigment, produced by Titan Kogyo, Ltd.)
d: Special Black 100 (trade name, carbon black pigment, primary average particle size 50 nm, produced by Orion Engineered Carbons)
e: MA-100 (trade name, carbon black pigment, primary average particle size 20 nm, produced by Mitsubishi Chemical Corporation)
f: Monarch 1300 (trade name, carbon black pigment, primary average particle size 10 nm, produced by Cabot Corporation)
g: CR-9800: aluminum flake pigment, average particle size 7 μm, produced by Asahi Kasei Chemicals Corporation Preparation of Color Base Coating Composition 1

100 parts by mass of Tipaque CR-95 (trade name, sulfate process titanium oxide pigment, produced by Ishihara Sangyo Kaisha, Ltd.) was mixed by stirring with 100 parts (solids content) of a resin component containing 75 parts of the hydroxy-containing acrylic resin obtained in Production Example 1 and 25 parts of U-Van 28-60 (trade name, butyl etherified melamine resin, produced by Mitsui Chemicals, Inc.). The mixture was diluted and adjusted to a viscosity suitable for coating, thereby preparing a color base coating composition having a solids content of about 25%.

Preparation of Metallic Base Coating Composition 1

10 parts by mass of Xirallic T60-10WNT Crystal Silver (trade name, aluminum oxide flake pigment coated with titanium oxide, produced by Merck & Co., Inc.) was mixed by stirring, with 100 parts (solids content) of a resin component containing 75 parts of the hydroxy-containing acrylic resin obtained in Production Example 1 and 25 parts of U-Van 28-60 (trade name, butyl etherified melamine resin, produced by Mitsui Chemicals, Inc.). The mixture was diluted and adjusted to a viscosity suitable for coating, thereby preparing a metallic base coating composition 1 having a solids content of about 25%.

Preparation of Metallic Base Coating Composition 2

7.2 parts by mass (solids content: 5 parts by mass) of aluminum paste 7640NS (trade name, aluminum flake pigment paste, produced by Toyo Aluminium K.K., solids content 65% by mass) was mixed by stirring with 100 parts (solids content) of a resin component containing 75 parts of the hydroxy-containing acrylic resin obtained in Production Example 1 and 25 parts of U-Van 28-60 (trade name, butyl etherified melamine resin, produced, by Mitsui Chemicals, Inc.). The mixture was diluted and adjusted to a viscosity suitable for coating, thereby preparing a metallic base coating composition 2 having a solids content of about 25%.

Preparation of Test Plates 1

A cationic electrodeposition coating composition "Elecron 9400HB" (trade name, produced by Kansai Paint Co., Ltd., epoxy resin polyamine-based cationic resin containing a blocked polyisocyanate compound as a curing agent) was applied by electrodeposition to degreased and zinc-phosphate treated steel plates (JISG3141, size 400×300×0.8 mm) so that the thus formed films, when cured, had a thickness of 20 μm, and then heated at 170° C. for 20 minutes for crosslinking and curing, thereby obtaining electrodeposition coating films.

Example 8

Coating composition 1 was applied to the electrodeposition coating film by using air spray so that the formed film, when cured, had a thickness of 25 μm, and then allowed to stand in a laboratory at a room temperature of about 20° C. for 15 minutes, followed by drying at 140° C. for 30 minutes by using a hot-air dryer. Color base coating composition 1 was applied to the dried coating film by using air spray so that the formed film, when cured, had a thickness of 25 μm, and then allowed to stand in a laboratory at a room temperature of about 20° C. for 15 minutes, followed by drying at 140° C. for 30 minutes by using a hot-air dryer, thereby preparing, a test plate.

Example 9

Coating composition 1 was applied to the electrodeposition coating film by using air spray so that the thus formed film, when cured, had a thickness of 25 μm, and then allowed to stand in a laboratory at a room temperature of about 20° C. for 15 minutes, followed by drying at 140° C. for 30 minutes by using a hot-air dryer. Metallic base coating composition 1 was applied to the dried coating film by using, air spray so that the formed film, when cured, had a thickness of 15 μm, and then allowed to stand in a laboratory at a room temperature of about 20° C. for 15 minutes. Then, a top clear coating composition (Ruga baking clear, produced by Kansai Paint Co., Ltd., trade name, acrylic resin/amino resin-based, organic solvent) was applied thereto by using air spray so that the formed film had a thickness of 30 μm, and then allowed to stand in a laboratory at a room temperature of about 20° C. for 15 minutes, followed by drying at 140° C. for 30 minutes by using a hot-air dryer, thereby preparing a test plate.

Example 10

The procedure of Example 9 was repeated except that metallic base coating composition 2 was used instead of metallic base coating composition 1, thereby preparing a test plate.

Examples 11, 14, 17, 20, 23, and 26, and Comparative Examples 4, 7, and 10

The procedure of Example 8 was repeated except that the coating compositions shown in Table 3 were used as an intermediate coating composition, instead of coating composition 1, thereby preparing test plates.

Examples 12, 15, 18, 21; 24, and 27, and Comparative Examples 5, 8, and 11

The procedure of Example 9 was repeated except that the coating compositions shown in Table 3 were used as an intermediate coating composition, instead of coating composition 1, thereby preparing test plates.

Examples 13, 16, 19, 22, 25, and 28, and Comparative Examples 6, 9, and 12

The procedure of Example 10 was repeated except that the coating compositions shown in Table 3 were used as an intermediate coating composition, instead of coating composition 1, thereby preparing test plates.

Accelerated Weathering Test (Peeling)

A cycle test combining irradiation and rain was conducted in accordance with the test procedure described in JIS K5600-7-7 (method 1) using a Super Xenon weather meter (trade name, accelerated weathering tester, produced by Suga Test Instruments Co., Ltd.). After the cycle test was performed for 3,000 hours in total, the test plates were observed to evaluate the presence or absence of peeling on the electrodeposition coating films. Table 3 shows the results.

TABLE 3

| | Intermediate Coating Film (25 μm) | Color Base Coating Film | Peeling |
| --- | --- | --- | --- |
| Example 8 | Coating Composition 1 | Color Base Coating Composition 1 (25 μm) | None |
| Example 9 | Coating Composition 1 | Metallic Base Coating Composition 1 (15 μm) + Top Clear Coating Composition (30 μm) | None |
| Example 10 | Coating Composition 1 | Metallic Base Coating Composition 2 (15 μm) + Top Clear Coating Composition (30 μm) | None |
| Example 11 | Coating Composition 2 | Color Base Coating Composition 1 (25 μm) | None |
| Example 12 | Coating Composition 2 | Metallic Base Coating Composition 1 (15 μm) + Top Clear Coating Composition (30 μm) | None |
| Example 13 | Coating Composition 2 | Metallic Base Coating Composition 2 (15 μm) + Top Clear Coating Composition (30 μm) | None |
| Example 14 | Coating Composition 3 | Color Base Coating Composition 1 (25 μm) | None |
| Example 15 | Coating Composition 3 | Metallic Base Coating Composition 1 (15 μm) + Top Clear Coating Composition (30 μm) | None |

TABLE 3-continued

| | Intermediate Coating Film (25 μm) | Color Base Coating Film | Peeling |
|---|---|---|---|
| Example 16 | Coating Composition 3 | Metallic Base Coating Composition 2 (15 μm) + Top Clear Coating Composition (30 μm) | None |
| Example 17 | Coating Composition 4 | Color Base Coating Composition 1 (25 μm) | None |
| Example 18 | Coating Composition 4 | Metallic Base Coating Composition 1 (15 μm) + Top Clear Coating Composition (30 μm) | None |
| Example 19 | Coating Composition 4 | Metallic Base Coating Composition 2 (15 μm) + Top Clear Coating Composition (30 μm) | None |
| Example 20 | Coating Composition 5 | Color Base Coating Composition 1 (25 μm) | None |
| Example 21 | Coating Composition 5 | Metallic Base Coating Composition 1 (15 μm) + Top Clear Coating Composition (30 μm) | None |
| Example 22 | Coating Composition 5 | Metallic Base Coating Composition 2 (15 μm) + Top Clear Coating Composition (30 μm) | None |
| Example 23 | Coating Composition 6 | Color Base Coating Composition 1 (25 μm) | None |
| Example 24 | Coating Composition 6 | Metallic Base Coating Composition 1 (15 μm) + Top Clear Coating Composition (30 μm) | None |
| Example 25 | Coating Composition 6 | Metallic Base Coating Composition 2 (15 μm) + Top Clear Coating Composition (30 μm) | None |
| Example 26 | Coating Composition 7 | Color Base Coating Composition 1 (25 μm) | None |
| Example 27 | Coating Composition 7 | Metallic Base Coating Composition 1 (15 μm) + Top Clear Coating Composition (30 μm) | None |
| Example 28 | Coating Composition 7 | Metallic Base Coating Composition 2 (15 μm) + Top Clear Coating Composition (30 μm) | None |
| Comp. Ex. 4 | Coating Composition 8 | Color Base Coating Composition 1 (25 μm) | Predominantly observed |
| Comp. Ex. 5 | Coating Composition 8 | Metallic Base Coating Composition 1 (15 μm) + Top Clear Coating Composition (30 μm) | Predominantly observed |
| Comp. Ex. 6 | Coating Composition 8 | Metallic Base Coating Composition 2 (15 μm) + Top Clear Coating Composition (30 μm) | Predominantly observed |
| Comp. Ex. 7 | Coating Composition 9 | Color Base Coating Composition 1 (25 μm) | Predominantly observed |
| Comp. Ex. 8 | Coating Composition 9 | Metallic Base Coating Composition 1 (15 μm) + Top Clear Coating Composition (30 μm) | Predominantly observed |
| Comp. Ex. 9 | Coating Composition 9 | Metallic Base Coating Composition 2 (15 μm) + Top Clear Coating Composition (30 μm) | Predominantly observed |
| Comp. Ex. 10 | Coating Composition 10 | Color Base Coating Composition 1 (25 μm) | Predominantly observed |
| Comp. Ex. 11 | Coating Composition 10 | Metallic Base Coating Composition 1 (15 μm) + Top Clear Coating Composition (30 μm) | Predominantly observed |
| Comp. Ex. 12 | Coating Composition 10 | Metallic Base Coating Composition 2 (15 μm) + Top Clear Coating Composition (30 μm) | Predominantly observed |

Production Example 2: Production of Acrylic Resin Emulsion 130 parts by mass of deionized water and 0.52 parts by mass of Aqualon KH-10 (trade name, surfactant, produced by DKS Co. Ltd.) were placed into a reactor equipped with a thermometer, a thermostat, a stirrer, a reflux condenser, and a dropping funnel, and mixed with stirring in a nitrogen stream, followed by heating to 80° C. Subsequently, 1% of monomer emulsion (1) detailed below and 5.3 parts by mass of a 6% ammonium persulfate aqueous solution were placed into the reactor and maintained at 80° C. for 15 minutes. Thereafter, the remaining monomer emulsion (1) was added dropwise over a period of 3 hours to the reactor maintained at the same temperature. After completion of the dropwise addition, the mixture was aged for 1 hour. Thereafter, monomer emulsion (2) detailed below was added dropwise over a period of 1 hour, and the mixture was aged for 1 hour. The mixture was then cooled to 30° C. while 40 parts by mass of a 5% aqueous dimethylethanolamine solution was gradually added to the reactor, and the cooled mixture was filtered through a 100-mesh nylon cloth, thereby obtaining an acrylic resin emulsion having an average particle size of 100 nm (after dilution with deionized water, the average particle size was measured at 20° C. using a "Coulter N4" submicron particle size distribution analyzer produced by Beckman Coulter) and a solids concentration of 30%. The obtained acrylic resin had an acid value of 33 mg KOH/g and a hydroxy value of 25 mg KOH/g.

Monomer emulsion (1): 42 parts by mass of deionized water, 0.72 parts by mass of Aqualon KH-10, 2.1 parts by mass of methylenebisacrylamide, 2.8 parts by mass of styrene, 16.1 parts by mass of methyl methacrylate, 28 parts by mass of ethyl acrylate, and 21 parts by mass of n-butyl acrylate were mixed with stirring, thereby obtaining monomer emulsion (1).

Monomer emulsion (2): 18 parts by mass of deionized water, 0.31 parts by mass of Aqualon KH-10, 0.03 parts by mass of ammonium persulfate, 5.1 parts by mass of methacrylic acid, 5.1 parts by mass of 2-hydroxyethyl acrylate, 3 parts by mass of styrene, 6 parts by mass of methyl methacrylate, 1.8 parts by mass of ethyl acrylate, and 9 parts by mass of n-butyl acrylate were mixed with stirring, thereby obtaining monomer emulsion (2).

Production Example 3: Production of Polyester Resin 109 parts by mass of trimethylolpropane, 141 parts by mass of 1,6-hexanediol, 126 parts by mass of hexahydrophthalic anhydride, and 120 parts by mass of adipic acid were placed in a reactor equipped with a thermometer, a thermostat, a stirrer, a reflux condenser, and a water separator. The mixture was heated from 160° C. to 230° C. over a period of 3 hours, followed by a condensation reaction at 230° C. for 4 hours. Subsequently, to add carboxyl groups to the obtained condensation reaction product, 38.3 parts by mass of trimellitic anhydride was further added thereto, and reacted at 170° C. for 30 minutes. The reaction product was diluted with 2-ethyl-1-hexanol, thereby obtaining a polyester resin solution having a solids concentration of 70%. The obtained polyester resin had an acid value of 46 mg KOH/g, a hydroxy value of 150 mg KOH/g, and a weight average molecular weight of 6,400. The term "weight average molecular weight" as used herein refers to a value determined by gel permeation chromatography (GPC) using the calibration curve of standard polystyrene.

Production Example 4: Preparation of Color Pigment Dispersion 1

8.6 parts (solids content: 6 parts) of the polyester resin solution obtained in Production Example 3, 36 parts of Tipaqur UT-771 (trade name, chloride process titanium oxide pigment, produced by Ishihara Sangyo Kaisha, Ltd.), and 61.3 parts of deionized water were placed into a stirring-and-mixing container, and homogeneously mixed. Further, 2-(dimethylamino)ethanol was added thereto, and the mixture was adjusted to pH 7.5. The obtained mixture was placed in a 225-mL mayonnaise bottle, and then 130 parts of zirconia beads having a diameter of 1.5 mm were added thereto. The bottle was hermetically sealed, and the mixture was dispersed for 120 minutes using a shaker-type paint conditioner. After dispersion, the obtained dispersion was filtered through a 100-mesh wire screen to remove the zirconia beads, thereby obtaining color pigment dispersion 1.

Production Example 5: Preparation of Color Pigment Dispersion 2

8.6 parts (solids content: 6 parts) of the polyester resin solution obtained in Production Example 3, 30 parts of Tarox LL-50 (trade name, yellow iron oxide pigment, produced by Titan Kogyo, Ltd.), and 61.3 parts of deionized water were placed into a stirring-and-mixing container, and homogeneously mixed. Further, 2-(dimethylamino)ethanol was added thereto, and the mixture was adjusted to pH 7.5. The obtained mixture was placed in a 225-mL mayonnaise bottle, and then 130 parts of zirconia beads having a diameter of 1.5 mm were added thereto. The bottle was hermetically sealed, and the mixture was dispersed for 120 minutes using a shaker-type paint conditioner. After dispersion, the obtained dispersion was filtered through a 100-mesh wire screen to remove the zirconia beads, thereby obtaining color pigment dispersion 2.

Production Example 6: Preparation of Color Pigment Dispersion 3

25.7 parts (solids content: 18 parts) of the polyester resin solution obtained in Production Example 3, 18 parts of Special Black 100 (trade name, carbon black pigment, primary average particle size 50 nm, produced by Orion Engineered Carbons), and 61.3 parts of deionized water were placed into a stirring-and-mixing container, and homogeneously mixed. Further, 2-(dimethylamino)ethanol was added thereto, and the mixture was adjusted, to pH 7.5. The obtained mixture was placed in a 225-mL Mayonnaise bottle, and then 130 parts of zirconia beads having a diameter of 1.5 mm were added thereto. The bottle was hermetically sealed, and the mixture was dispersed for 120 minutes using a shaker-type paint conditioner. After dispersion, the obtained dispersion was filtered through a 100-mesh wire screen to remove the zirconia beads, thereby obtaining color pigment dispersion 3.

Example 29

100 parts of the acrylic resin emulsion obtained in Production Example 2, 33.2 parts of the polyester resin solution obtained in Production Example 3, 294.1 parts of color pigment dispersion 1 obtained in Production Example 4, 1.0 parts of color pigment dispersion 2 obtained in Production Example 5, 0.24 parts of pigment dispersion 3 obtained in Production Example 6, and 37.5 parts of Cymel 325 (trade name, produced by Cytec Industries Japan LLC, melamine resin, solids content: 80%) were homogeneously mixed. Further, Primal ASE-60 (trade name, produced by Rohm & Haas Co., Ltd., polyacrylic acid thickener), 2-(dimethylamino)ethanol, and deionized water were added thereto, thereby preparing aqueous coating composition 11 having a pH of 8.0, a coating composition solids content of 25%, and a viscosity of 40 seconds as measured by Ford cup No 4 at 20° C. The proportion of the coloring materials contained in aqueous coating composition 11 prepared in Example 29 is the same as that of coating composition 1.

TABLE 4

| Light Transmittance (%) Average in the range of | Colorimetric value (45/0) | | | Finished |
|---|---|---|---|---|
| 420 to 480 nm | L* | a* | b* | Appearance |
| 0.8 | 87.0 | −1.0 | 3.0 | 5 |

Production Example 7: Preparation of Color Pigment Dispersion 4

8.6 parts (solids content: 6 parts) of the polyester resin solution obtained in Production Example 3, 36 parts of Tipaque CR-95 (trade name, sulfate process titanium oxide pigment, produced by Ishihara Sangyo Kaisha, Ltd.), 1.4 parts of Solsperse 12000 (trade name, phthalocyanine-based pigment derivative produced by Lubrisol), and 61.3 parts of deionized water were placed into a stirring-and-mixing container, and homogeneously mixed. Further, 2-(dimethylamino)ethanol was added thereto, and the mixture was adjusted to pH 7.5. The obtained mixture was placed in a 225-mL mayonnaise bottle, and then 130 parts of zirconia beads having a diameter of 1.5 mm were added thereto. The bottle was hermetically sealed, and the mixture was dispersed for 120 minutes using a shaker-type paint conditioner. After dispersion, the obtained dispersion was filtered through a 100-mesh wire screen to remove the zirconia beads, thereby obtaining color pigment dispersion 4.

Preparation of Color Base Coating Composition 2

100 parts of the acrylic resin emulsion obtained in Production Example 2, 33.9 parts of the polyester resin solution obtained in Production Example 3, 298.1 parts of pigment dispersion 4 obtained in Production Example 7, and 37.5 parts of Cymel 325 (trade name, produced by Cytec Industries Japan LLC, melamine resin, solids content: 80%) were homogeneously mixed. Further, Primal ASE-60 (trade name, produced by Rohm & Haas Co., Ltd., polyacrylic acid thickener), 2-(dimethylamino)ethanol, deionized water were added thereto, thereby preparing an aqueous coating composition having a pH of 8.0, a coating composition solids content of 25%, and a viscosity of 40 seconds as measured by Ford cup No. 4 at 20° C. The proportion of the coloring materials contained in color base coating composition 2 is the same as that of the color base coating composition 1.
Preparation of Test Plates 2

In accordance with the procedure for the "Preparation of Test Plates 1," an electrodeposition coating composition was applied to the steel plates to form coating films, and the thus obtained films served as substrates. Coating composition 11 prepared in Example 29 was applied to the substrates by using air spray such that the formed films, when cured, had a thickness of 25 µm, and was heated at 80° C. for 10 minutes using a hot-air drying furnace. Color base coating composition 2 was then applied thereto by using air spray such that the formed films, when cured, had a thickness of 25 µm, and then allowed to stand in a laboratory at a room temperature of about 20° C. for 15 minutes, followed by heating with a hot-air dryer at 140° C. for 30 minutes, thereby obtaining test plates. The obtained test plates were evaluated for the presence or absence of peeling on the electrodeposition coating films in accordance with the above-described procedure for the "Accelerated Weathering Test," and no peeling was observed.

Production Example 8: Production of Phosphoric Acid Group-Containing Resin Solution A mixture solvent containing 27.5 parts of methoxypropanol and 27.5 parts of isobutanol was placed into a reactor equipped with a thermometer, a thermostat, a stirrer, a reflux condenser, and a dropping funnel, and heated to 110° C. While the reactor was maintained at 110° C., 121.5 parts of a mixture containing 25 parts of styrene, 27.5 parts of n-butyl methacrylate, 20 parts of branched higher alkyl acrylate (trade name "isostearyl acrylate," produced by Osaka Organic Chemical Industry Ltd.), 7.5 parts of 4-hydroxy butyl acrylate, 15 parts of the phosphoric acid group-containing polymerizable monomer detailed below, 12.5 parts of 2-methacryloyloxy ethyl acid phosphate, 10 parts of isobutanol, and 4 parts of tert-butylperoxy octanoate was added dropwise to the mixture solvent over a period of 4 hours. Further, a mixture of 0.5 parts of tert-butylperoxy octanoate and 20 parts of isopropanol was added dropwise thereto over a period of 1 hour. Thereafter, the mixture was aged for 1 hour with stirring, thereby obtaining a phosphoric acid group-containing resin, solution having a solids content of 50%. The phosphoric acid group-containing resin had an acid value of 83 mg KOH/g, a hydroxy value of 29 mg KOH/g, and a weight average molecular weight of 10,000. Phosphoric acid group-containing polymerizable monomer: 57.5 parts of monobutyl phosphoric acid and 41 parts of isobutanol were placed into a reactor equipped with a thermometer, a thermostat, a stirrer, a reflux condenser, and a dropping funnel, and heated to 90° C. Thereafter, 42.5 parts of glycidyl methacrylate was added dropwise thereto over a period of 2 hours, and then further aged with stirring for 1 hour. Subsequently, 59 Parts of isopropanol was added thereto, thereby obtaining a Phosphoric acid group-containing polymerizable monomer solution having a solids content of 50%. The obtained monomer had an acid value of 285 mg KOH/g.

Production Example 9: Preparation of High-concentration Flake-effect Pigment Liquid 10 parts of Xirallic T60-10WNT Crystal Silver (trade name, aluminum oxide flake pigment coated with titanium oxide, produced by Merck & Co., Inc.), 8 parts of the phosphoric acid group-containing resin solution (solids content: 4 parts), 38.5 parts of 2-ethyl-1-hexanol (the mass of which dissolved in 100 g of water at 20° C. is 0.1 g), and 0.5 parts of 2-(dimethylamino)ethanol were homogeneously mixed in a stainless beaker, thereby obtaining a high-concentration flake-effect pigment liquid.
Preparation of Metallic Base Coating Composition 3

100 parts of the acrylic resin emulsion obtained in Production Example 2, 57.1 parts of the polyester resin solution obtained in Production Example 3, 60.5 parts of the high-concentration flake-effect pigment liquid obtained in Production Example 9, and 37.5 parts of Cymel 325 (trade name, produced by Cytec Industries Japan LLC, melamine resin, solids content: 80%) were homogeneously mixed. Further, Primal ASE-60 (trade name, produced by Rohm & Haas, polyacrylic acid thickener), 2-(dimethylamino)ethanol, and deionized water were added thereto, thereby obtaining an aqueous coating composition having a pH of 8.0, a coating composition solids content of 25%, and a viscosity of 40 seconds as measured by Ford cup No. 4 at 20° C.

The proportion of the coloring materials contained in metallic base coating composition 3 is the same as that of metallic base coating composition 1.

Production Example 10: Preparation of High-concentration Aluminum Pigment Liquid 15.4 parts (solids content: 10 parts) of aluminum paste 7640NS (trade name, aluminum flake pigment paste, produced by Toyo Aluminium K.K., solids content: 65% by mass), 8 parts (solids content: 4 parts) of the phosphoric acid group-containing resin solution, 38.5 parts of 2-ethyl-1-hexanol (the mass of which dissolved in 100 g of water at 20° C. is 0.1 g), and 0.5 Parts of 2-(dimethylamino)ethanol were homogeneously mixed in a stainless beaker, thereby obtaining a high-concentration aluminum pigment liquid.
Preparation of Metallic Base Coating Composition 4

100 parts of the acrylic resin emulsion obtained in Production Example 2, 57.1 parts of the polyester resin solution obtained in Production Example 3, 60.5 parts of the high-concentration aluminum pigment liquid obtained in Production Example 10, and 37.5 parts of Cymel 325 (trade name, produced by Cytec Industries Japan LLC, melamine resin, solids content: 80%) were homogeneously mixed. Further, Primal ASE-60 (trade name, produced by Rohm & Haas, polyacrylic acid thickener), 2-(dimethylamino)ethanol, and deionized water were added thereto, thereby obtaining an aqueous coating composition having a pH of 8.0, a coating composition solids content of 25%, and a viscosity of 40 seconds as measured by Ford cup No 4 at 20° C.

The proportion of the coloring materials contained in metallic base coating composition 4 is the same as that of metallic base coating composition 2.
Preparation of Test Plates 3

In accordance with the procedure for the "Preparation of Test Plates 1," an electrodeposition coating composition was applied to the steel plates to form coating films; the thus obtained films served as substrates. Coating composition 11 prepared in Example 29 was applied to the substrates by using air spray such that the formed films, when cured, had a thickness of 25 µm, and then allowed to stand in a laboratory at a room temperature of about 20° C. for 15 minutes, followed by drying with a hot-air dryer at 140° C. for 30 minutes. Metallic base coating composition 3 or 4 was then applied to the thus obtained coating films using air spray such that the formed films, when cured, had a thickness of 15 µm, and heated by using a hot-air drying furnace at 80° C. for 10 minutes. A top clear coating composition (Ruga baking clear, produced by Kansai Paint Co., Ltd., trade name, acrylic resin/amino resin-based, organic solvent) was then applied to the dried films by using air spray such that the films had a thickness of 30 μm, and allowed to stand in a laboratory at a room temperature of about 20° C. for 15 minutes, followed by drying using a hot-air dryer at 140° C. for 30 minutes, thereby obtaining test plates. The obtained test plates were evaluated for the presence or absence of peeling on the electrodeposition coating films in accordance with the above-described procedure for the "Accelerated Weathering Test," and no peeling was observed.

Production Example 11: Production of Hydroxy-containing Acrylic Resin 2

50 parts of xylene and 22 parts of butyl acetate were placed in a reactor equipped with a thermometer, a thermostat, a stirrer, a reflux condenser, and a dropping funnel, and mixed with stirring, followed by heating to 120° C. Subsequently, mixture 2 of a monomer and a polymerization initiator detailed below was added dropwise over a period of 3 hours to the reactor maintained at the same temperature. After completion of the dropwise addition, the mixture was aged for 1 hour. Thereafter, a mixture of 10 parts of xylene and 0.6 parts of 2,2'-azobis(2-methylpropionitrile) was added dropwise over a period of 1 and a half hours to the reactor maintained at the same temperature, followed by aging for 2 hours, thereby obtaining hydroxy-containing acrylic resin 2 having a hydroxy value of 82 mg KOH/g, a number average molecular weight of 20,000, and a resin solids content of 55%.

Mixture 2 containing a monomer and a polymerization initiator:

A mixture containing 27 parts of methyl, methacrylate, 17 parts of ethyl acrylate, 23 parts of n-butyl acrylate, 19 parts of hydroxyethyl methacrylate, 30 parts of styrene, 1 part of acrylic acid, and 2.5 parts of 2,2'-azobis(2-methylpropionitrile)

Preparation of Clear Coating Composition (2-pack Composition)

100 parts (solids content) of hydroxy-containing acrylic resin 2 obtained in Production Example 11, 3 parts of Tinuvin 400 (trade name, hydroxyphenyl triazine-based ultraviolet absorber, produced by Ciba Specialty Chemicals), 1 part of Tinuvin292 (trade name, light absorbing stabilizer, produced by Ciba Specialty Chemicals), and 0.1 parts of Modaflow (trade name, surface control agent, produced by Monsanto Company) were mixed with stirring. Subsequently, 27 Parts of Sumidur N3300 (trade name, HDI trimeric isocyanurate, produced by Sumika Bayer Urethane Co., Ltd.,) was added thereto, and mixed with stirring, followed by dilution to a viscosity suitable for coating, thereby preparing a clear coating composition.

Preparation of Test Plates 4

Coating composition 1 was applied to the electrodeposition coating films by using air spray such that the formed film, when cured, had a thickness of 25 μm, and then allowed to stand in a laboratory at a room temperature of about 20° C. for 15 minutes. Metallic base coating composition 3 or 4 was then applied to the films by using air spray such that the formed films, when cured, had a thickness of 15 μm, and then allowed to stand in a laboratory at a room temperature of about 20° C. for 15 minutes, followed by drying using a hot-air dryer at 140° C. for 30 minutes. Thereafter, the 2-pack clear coating composition was applied to the dried films by using air spray such that the formed films, when cured, had a thickness of 30 μm, and then allowed to stand in a laboratory at a room temperature of about 20° C. for 15 minutes, followed by drying using a hot-air dryer at 80° C. for 30 minutes, thereby preparing test plates. The obtained test plates were evaluated for the presence or absence of peeling on the electrodeposition coating films in accordance with above-described procedure for the "Accelerated Weathering Test," and no peeling was observed.

INDUSTRIAL APPLICABILITY

The coating composition and the method for forming a coating film according to the present invention are applicable to a variety of industrial products, particularly automobile exterior panels.

The invention claimed is:

1. A coating composition comprising
   a chloride process titanium oxide pigment,
   a yellow iron oxide pigment,
   a carbon black pigment having a primary average particle size of 15 to 80 nm, and
   a resin composition, which is a vehicle-forming component,
   wherein when the coating composition is applied to give a cured film having a thickness of 25 μm, the resulting cured coating film has an average light transmittance within the range of 0.1 to 1.0% at a wavelength of 420 nm to 480 nm, and
   when the coating composition is applied to give a cured film having a thickness of 25 μm, the resulting cured coating film has an L*value within the range of 80 to 95, an a*value within the range of −2.0 to 2.0, and a b*value within the range of 0.1 to 5.0 in the L*a*b* color space.

2. A method for forming a multilayer coating film, the method comprising forming a color base coating film on a coating film obtained by applying the coating composition according to claim 1 to a substrate.

3. The method for forming a multilayer coating film according to claim 2, wherein the color base coating film comprises a coating film obtained by applying a metallic coating composition containing a flake-effect pigment; and a coating film obtained by applying a top clear coating composition.

* * * * *